United States Patent [19]

Nagaoka

[11] Patent Number: 5,311,942
[45] Date of Patent: May 17, 1994

[54] WELL SCREEN HAVING A PROTECTIVE FRAME FOR A HORIZONTAL OR HIGH-ANGLE WELL

[75] Inventor: Tadayoshi Nagaoka, Minami, Japan

[73] Assignee: Nagaoka International Corporation, Osaka, Japan

[21] Appl. No.: 922,137

[22] Filed: Jul. 30, 1992

[51] Int. Cl.$^5$ ............................................. E21B 43/08
[52] U.S. Cl. ................................ 166/232; 166/233; 166/234; 210/499
[58] Field of Search .............. 166/234, 235, 233, 232, 166/231, 228; 210/497.1, 497.01, 499

[56] References Cited

U.S. PATENT DOCUMENTS

| | | | |
|---|---|---|---|
| 725,117 | 4/1903 | Morris | 166/235 X |
| 3,712,373 | 1/1973 | Bearden et al. | 166/232 |
| 4,657,079 | 4/1987 | Nagaoka | 166/231 |
| 4,818,403 | 4/1989 | Nagaoka | 210/499 X |
| 5,004,049 | 4/1991 | Arterbury | 166/228 |

FOREIGN PATENT DOCUMENTS

| | | | |
|---|---|---|---|
| 777208 | 12/1980 | U.S.S.R. | 166/232 |
| 983256 | 12/1982 | U.S.S.R. | 166/231 |
| 1116144 | 9/1984 | U.S.S.R. | 166/231 |

Primary Examiner—Hoang C. Dang
Attorney, Agent, or Firm—Hedman, Gibson & Costigan

[57] ABSTRACT

A well screen for a horizontal or high-angle well includes a screen main body and a protective frame. The screen main body has screen rods arranged in the circumferential direction of the well screen and a screen wire wound on the screen rods. The protective frame includes protective rods provided on the outside of the screen wire in the circumferential direction and extending in the axial direction of the well screen, annular rod holding members provided with interval in the axial direction for holding the protective rods, and a protective wire wound about the protective rods. When the well screen forced into the well passes through a bent section of the well, the protective frame slides in contact with the wall surface of the bent section thereby protecting the screen wire. A gap of a predetermined value is formed between the protective rods and the outer surface of the screen wire of the screen main body so that, by adjusting this gap suitably, the screen wire will pass through a bent section of the well without contacting the protective rods or, even if the screen wire contacts the protective rods, the screen wire will not receive a damaging force from the protective rods.

2 Claims, 3 Drawing Sheets

WELL SCREEN HAVING A PROTECTIVE FRAME FOR A HORIZONTAL OR HIGH-ANGLE WELL

BACKGROUND OF THE INVENTION

This invention relates to a well screen used for a horizontal or high-angle well and, more particularly, to this type of well screen capable of preventing damage to the screen or deformation of slits of the screen which tends to occur when the screen passes through a bent portion of the well in forcing the screen through this type of well.

There is an increasing tendency in the field of wells for collecting oil, water, etc. to using, instead of a vertical well which is formed by vertically digging the ground from the ground surface toward an oil or water stratum, a horizontal or high-angle well which, as shown in FIG. 4, is formed by digging a vertical section 1a, a bent section 1b and a horizontal or high-angle section 1c extending horizontally or obliquely along an oil or water stratum 2. Such horizontal or high-angle well is advantageous in that, since a screen portion of such horizontal or high-angle well from which oil or water can be collected has a length as many times as a vertical well, such horizontal or high-angle well has an oil or water production efficiency as many times as a vertical well.

A screen 3 used in the horizontal or inclined well 1 has a vertical pipe section 3a extending from the ground surface to the oil or water stratum 2, a bent screen section 3b and a horizontal or high-angle screen section 3c extending horizontally or obliquely along the oil or water stratum. In setting this screen 3 in the well 1, a straight-line screen is gradually forced into the well 1 from the ground surface and the screen is bent from the vertical section 1a of the well 1 in conformity with the configuration of the well 1 and the horizontal or high-angle section 3c is thereby formed.

In such horizontal or high-angle well 1, the screen sections 3b and 3c of the straight-line screen which is forced into the well 1 are sequentially bent when the screen portion of these sections 3b and 3c pass through the bent section 1b of the well 1 and the horizontal section 3c is elastically restored to the straight-line configuration after passing through the bent section 1b of the well 1. The screen wire of the screen 3, however, is forcibly bent by sliding along the bent section 1b of the well 1 while it is pressed with a strong force against the wall surface of the bent section 1b and this often causes damage to the screen wire or causes plastic deformation of the screen wire which prevents restoration of the screen wire to the original configuration after the screen portion has reached the horizontal section 1c with the result that irregularity occurs in the width of the slits of the screen wire.

It is, therefore, an object of the invention to provide a well screen for a horizontal or high-angle well which is capable of effectively preventing damage to or plastic deformation of the screen which occurs when the screen passes through a bent section of the well.

SUMMARY OF THE INVENTION

A well screen for a horizontal or high-angle well achieving the above described object of the invention includes a screen main body and a protective frame, said screen main body having a plurality of screen rods arranged in the circumferential direction of the well screen and a screen wire wound on said screen rods and said protective frame comprising a plurality of protective rods provided on the outside of the screen wire with a predetermined interval in the circumferential direction of the well screen and extending in the axial direction of the well screen, a plurality of annular rod holding members provided with a predetermined interval in the axial direction of the well screen for holding the protective rods and protective wire means provided about the protective rods in the circumferential direction of the well screen, a gap of a predetermined value being formed between the protective rods and the outer surface of the screen wire of the screen main body.

According to the invention, when, in forcing a well screen into a well, the screen passes through a bent section of the well, the protective frame having the protective rods and the protective wire slides along the bent section of the well while contacting the wall surface of the well. The inner screen wire therefore is in no case brought into contact with the wall surface of the well but is elastically deformed inside of the protective frame and, upon reaching of the well screen to the horizontal section of the well, the screen wire is restored to its original configuration. Moreover, since there is a gap of a predetermined value provided between the protective rods of the protective frame and the outer surface of the screen wire, by adjusting this value of the gap to a proper value, an adjustment can be made so that, when the well screen passes through the bent section of the well, the screen wire will not be brought into contact with the protective rods of the protective frame or, even if it is brought into contact with some of the protective rods, the screen wire will not receive from the protective rods such an excessive load that will cause plastic deformation of the screen wire. Accordingly, in forcing the well screen into the well, damage or plastic deformation caused to the well screen by passing through a bent section of the well can be effectively prevented and a constant slit width of the screen wire can be maintained in all conditions of the well.

A preferred embodiment of the invention will be described with reference to the accompanying drawings.

BRIEF DESCRIPTION OF THE DRAWINGS

In the accompanying drawings.

DESCRIPTION OF PREFERRED EMBODIMENTS

Figure 1:
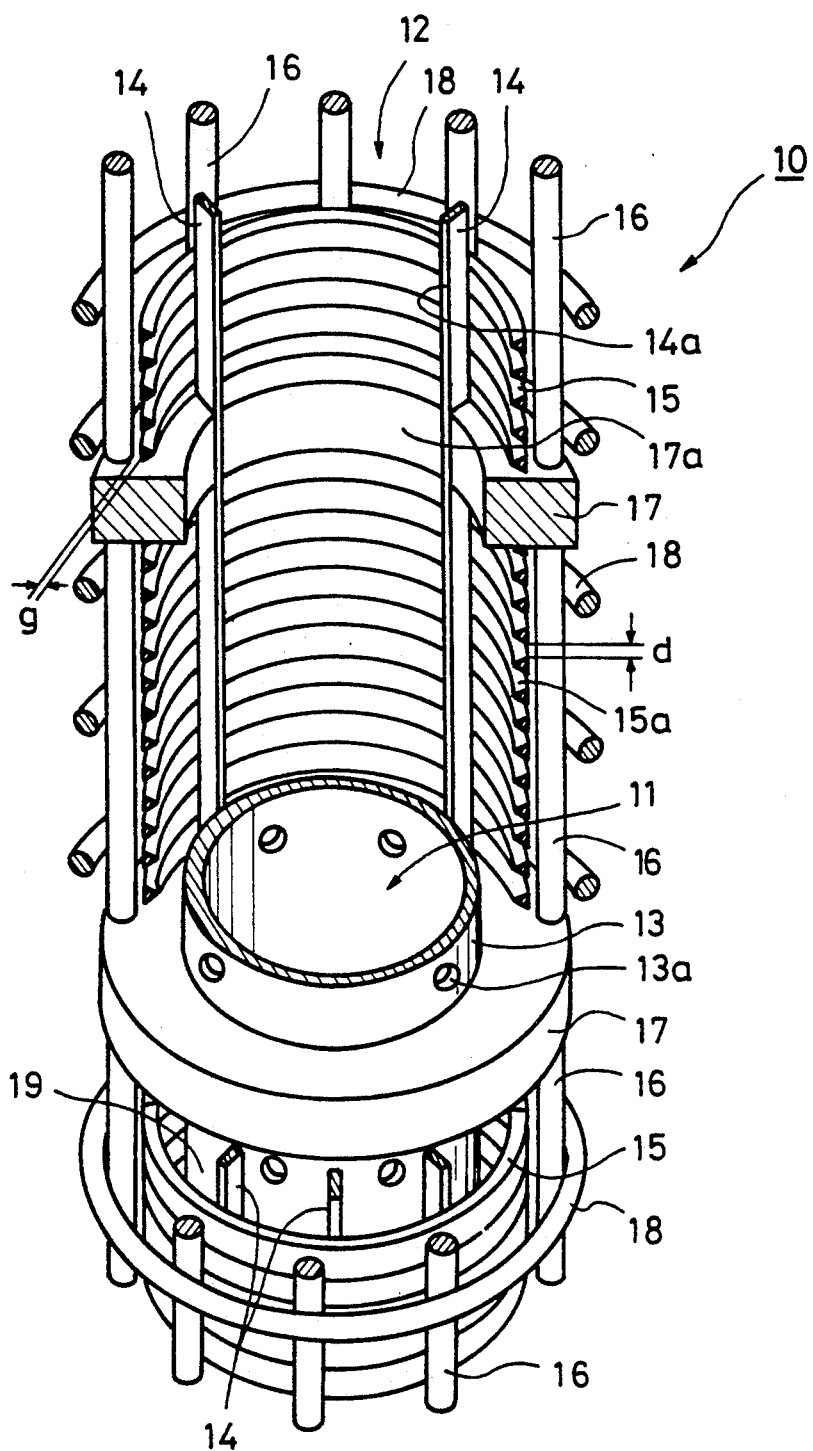
FIG. 1 is a perspective view of an embodiment of the well screen according to the invention shown with a part thereof being removed.
Figure 2:
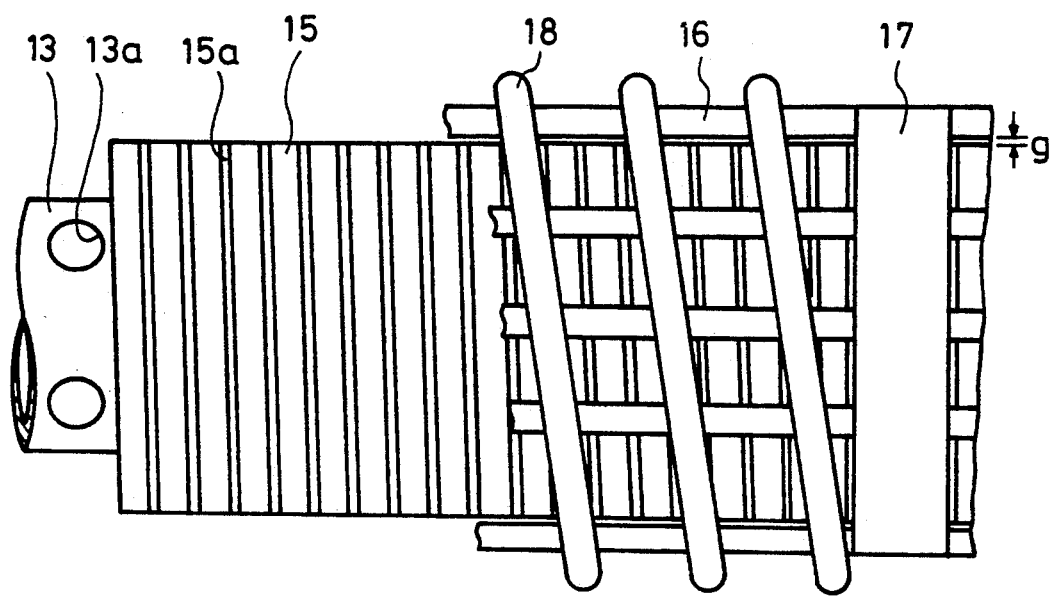
FIG. 2 is a side view of the screen of FIG. 1 shown with a part thereof being removed.
Figure 3:
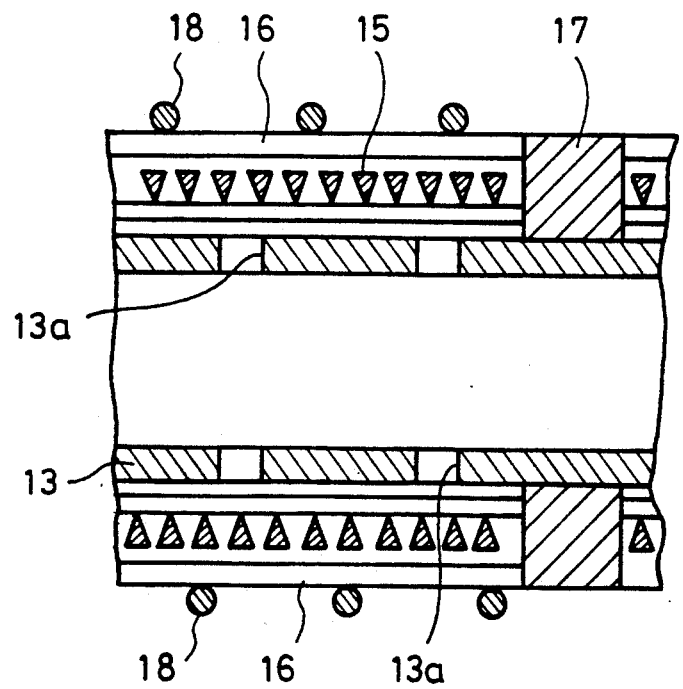
FIG. 3 is a sectional view of a part of the well screen in the axial direction.

FIGS. 1-3 show an embodiment of the well screen with a protective frame for a horizontal or high-angle well according to the invention.

A well screen 10 consists of a screen main body 11 and a protective frame 12. The screen main body 11 includes a perforated pipe 13 perforated with a multiplicity of liquid taking opening 13a, a plurality of screen rods 14 provided on the outside of the perforated pipe 13, extending in the axial direction of the well screen 10 and arranged in the circumferential direction of the well screen 10 with an equal interval between respective adjacent screen rods, and a screen wire 15 wound spirally on the outside of the screen rods 14. This screen main body 11 is of a well known structure in the field of oil wells. A slit 15a having a predetermined width d is formed between respective wire portions which are adjacent to each other in the axial direction of the well screen 10.

The protective frame 12 includes a plurality of protective rods 16 arranged in the circumferential direction on the outside of the cylindrical screen wire 15 and extending in the axial direction of the well screen 19, annular rod holding members 17 holding the protective rods 16 at either end thereof and a protective wire 18 wound spirally on the outside of the protective rods 16. Each protective rod 16 is fixed at both ends to the rod holding members 17 by means of welding or other means. The protective wire 18 is welded to the protective rods 16 at each point of contact with the protective rods 16. The protective wire 18 is provided for forming a grid-like structure with the protective rods 16, so that the pitch of the protective wire 18 will suffice if it is sufficient for maintaining the strength required for the purpose of the protective frame.

There is provided a gap g of a predetermined value between the respective protective rods 16 and the outer surface of the screen wire 15. This gap g is determined at a proper value taking into account the diameter of the well, radius of curvature of the bent section 1b of the well and other design conditions in such a manner that, in passing of the well screen 10 through the best section 1b, the bent screen wire 15 will not be brought into contact with the bent protective rods 16 or, even if the bent screen wire 15 is brought into contact with some of the bent protective rods 16, the screen wire 15 will not receive from the protective rods 16 an excessive load which will cause plastic deformation to the screen wire 15.

In the illustrated embodiment, the annular rod holding members 17 are fixed to the screen rods 14 by suitable means such as welding in suitable locations between ends of a single well screen 10. By fixing the annular rod holding members 17 to the screen rods 14, a desired number of the annular rod holding members 17 can be disposed between the ends of a single well screen 10. Accordingly, by determining the interval between the respective annular rod holding members 17 at a sufficiently short distance, the respective screen rods 14 and the screen wire 15 in each section between the two adjacent annular rod holding members 17 are bent substantially uniformly in the bent section 1b of the well and, as a result, the slit 15a of the screen wire 15 in the bent section 3b of the screen 3 undergoes substantially a uniform change. Consequently, in the illustrated embodiment in which a desired number of the annular rod holding members 17 can be disposed between the ends of a single screen 10, there is less likelihood of occurrence of irregularity in the slit width d of the screen wire 15 in the bent section 3b of the screen 10 than in the case where the annular rod holding members 17 are provided only at the two ends of a single screen 10.

In the illustrated embodiment, the inner peripheral surface 17 of each annular rod holding member 17 is in sealing engagement with the outer surface of the perforated pipe 13. By this arrangement, the respective annular rod holding members 17 divide space 19 defined between the outer surface of the perforated pipe 13 and the inner peripheral surface of the screen wire 15 in the axial direction of the well screen 10 and isolate the respective spaces formed by this division of the space 19. Therefore, in a case where washing liquid or other liquid is injected from the inside of the screen 10 toward the outside of the screen 10 for the purpose of cleaning a specific part of the screen 10 or for other purpose, flowing out of the washing liquid or other liquid through the space 19 to other part of the screen 10 without concentrating on the target part can be prevented whereby cleaning or other operation can be effectively carried out.

The operation for setting this well screen 10 having the protective frame in a horizontal or high-angle well will now be described.

Figure 4:
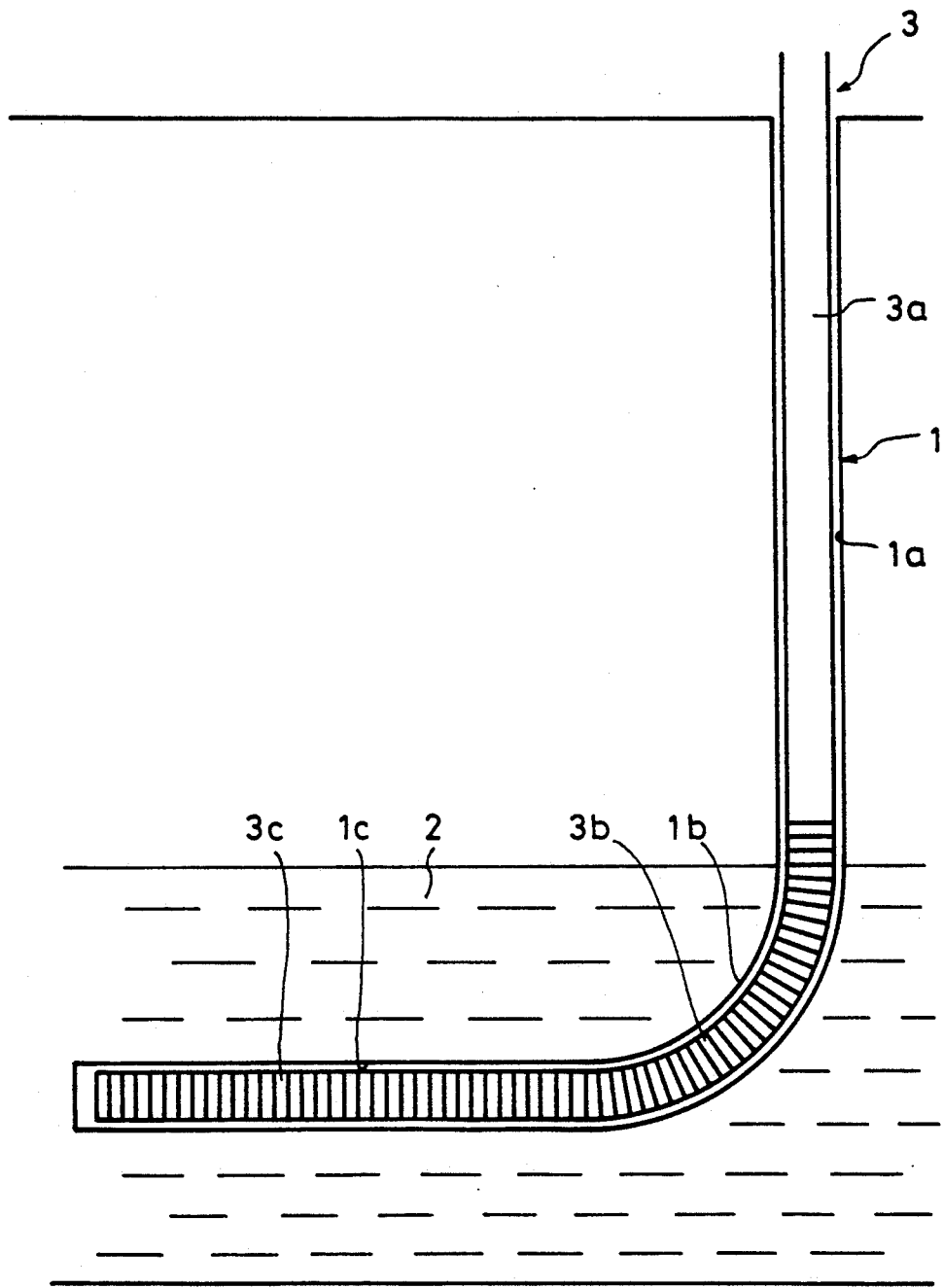
FIG. 4 is a schematic view showing an example of a horizontal well.

A plurality of the screen 10 of the above described structure are connected in series and pushed into a horizontal or high-angle well as shown in FIG. 4. When each screen 10 passes through the bent section 1b of the well, the screen wire 15 is bent in conformity with the configuration of the bent section 1b. It is, however, the protective wire 18 of the protective frame 12 that slides in contact with the wall surface of the bent section 1b of the well, and the screen wire 15 is not brought into contact with the wall surface of the bent section 1b of the well but is elastically deformed inside of the protective frame 12 and thereafter is restored to its original configuration when the screen 10 has reached the horizontal section 1c of the well.

In the above described embodiment, rods and wire of a circular cross section are used as the protective rods 16 and the protective wire 18. Alternatively, members of other cross sections such as rhombic, square and triangle cross sections may be used.

The annular rod holding members 17 are not limited to the ones of the illustrated shape. The annular rod holding members 17 may be also ones whose length in the axial direction of the screen is larger than length in the radial direction of the screen.

As a manner of fixing the annular rod holding members 17 to the screen main body 11, the manner of the above described embodiment according to which the annular rod holding members 17 are fixed to the screen rods 14 of the screen main body 11 is particularly preferable because, as described above, the slit width d of the screen wire 15 can be uniformly maintained. The invention, however, is not limited to this structure but the annular rod holding members may be provided only at two ends of one screen.

The screen main body is not limited to the illustrated one employing the perforated pipe 13 but other known or unknown type of screen such as the screen disclosed in Japanese Patent Publication No. 32275/1983 which uses reinforcing rings instead of a perforated pipe may be used as the screen main body.

If conditions under which the screen is used permit, the protective wire may be welded to a part of the protective rods instead of being welded at all points of contact with all protective rods. Alternatively further, the protective wire may be welded at ends thereof to the annular rod holding members without being welded to the protective rods at all. Further, as the protective wire, a plurality of rings may be arranged at interval on the outside of the protective rods and welded to the protective rods at all points of contact instead of using a spiral wire as used in the above described embodiment.

What is claimed is:

1. A well screen for a horizontal or high angle well including a screen main body having a plurality of screen rods arranged in the circumferential direction of the well screen and a screen wire wound on said screen rods and said protective frame comprising:
   a plurality of protective rods provided on the outside of the screen wire with a predetermined interval in the circumferential direction of the well screen and extending in the axial direction of the well screen;
   a plurality of annular rod holding members provided with a predetermined interval in the axial direction of the well screen for holding the protective rods;
   protective wire means provided about the protective rods in the circumferential direction of the well screen, and
   a circumferential gap of a predetermined value, said gap being formed between the protective rods and the outer surface of the screen wire of the screen main body, and extending longitudinally between said plurality of annular rod holding members.

2. A well screen as defined in claim 1 wherein said annular rod holding members are fixed to said screen rods of the screen main body at selected locations between the ends of a single screen unit.

* * * * *